H. C. McCARTY.
SAFETY VALVE.
APPLICATION FILED JULY 2, 1909.

953,052.

Patented Mar. 29, 1910.
2 SHEETS—SHEET 2.

Witnesses:-
Ralph Warnken
L. H. Latham

Harry C. McCarty
Inventor.
By
Attorneys

UNITED STATES PATENT OFFICE.

HARRY C. McCARTY, OF WILLIAMSPORT, PENNSYLVANIA.

SAFETY-VALVE.

953,052.   Specification of Letters Patent.   Patented Mar. 29, 1910.

Application filed July 2, 1909. Serial No. 505,564.

*To all whom it may concern:*

Be it known that I, HARRY C. MCCARTY, a citizen of the United States of America, residing at the city of Williamsport, county of Lycoming, State of Pennsylvania, have invented certain new and useful Improvements in Safety-Valves, of which the following is a specification.

My invention relates to safety valves and more particularly to valves of the type known as muffled pop safety valves. As heretofore made, such valves embody certain structural defects which prevent their perfect operation.

To remedy these defects is the object of the improvements which constitute my invention. The nature of these improvements will more fully appear from the following description taken in connection with the accompanying drawing.

Figure 1:
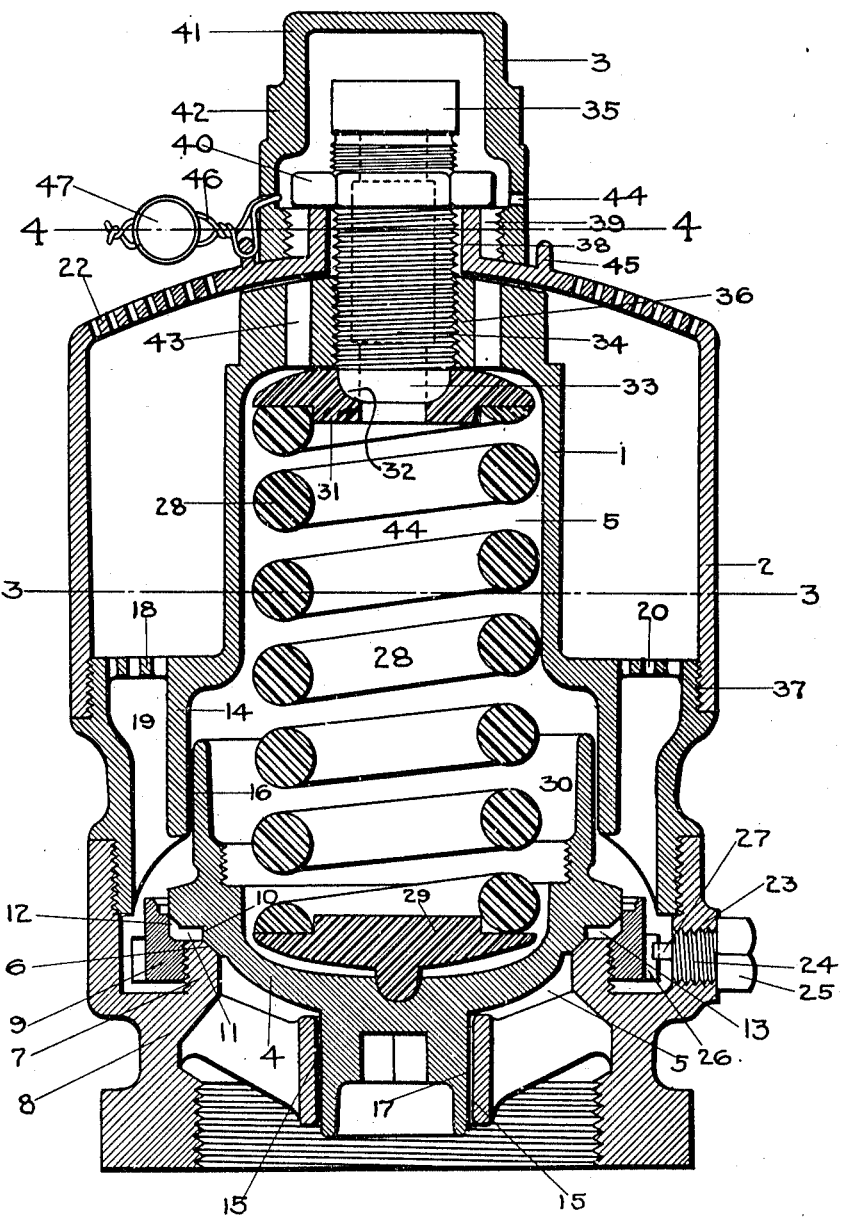
Figure 2:
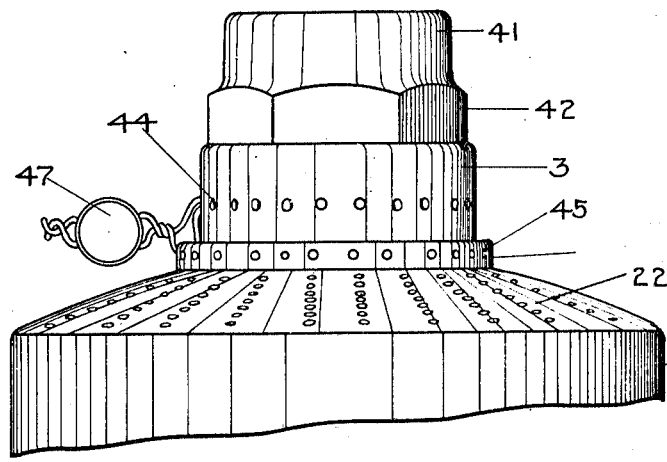
Figure 4:
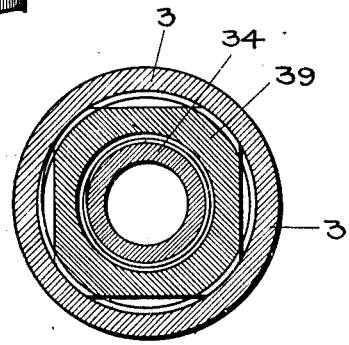
Figure 3:
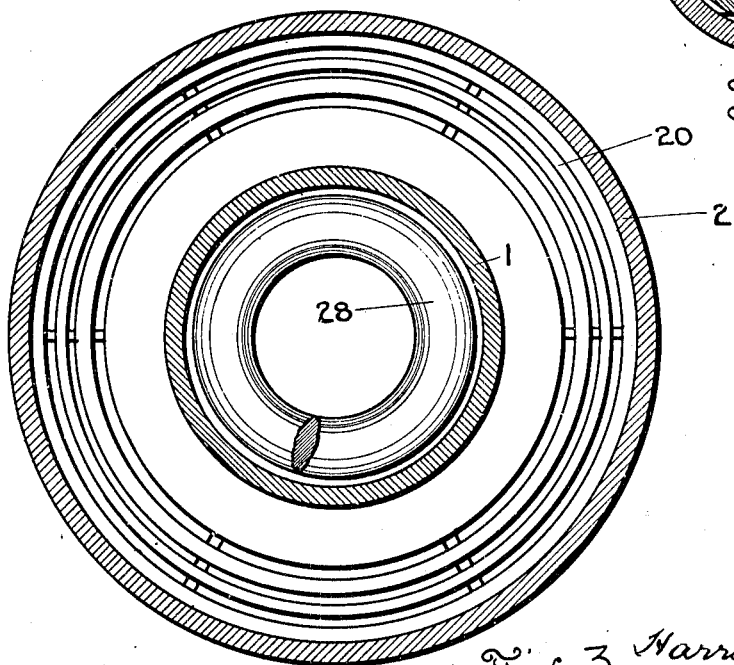

Figure 1 is a vertical axial cross-section of a safety valve embodying the invention. Fig. 2 is a fragmentary elevation of the upper portion of the dome showing the cap. Fig. 3 is a horizontal cross-section on the line 3—3 of Fig. 1. Fig. 4 is a horizontal section on the line 4—4 of Fig. 1.

The valve shown in the drawing and in connection with which the operation of my invention will be described consists of a casing 1, a dome 2, a cap 3, and a valve proper 4. The valve casing incloses a central valve chamber 5 which is encircled intermediately by a valve seat 6. This seat is preferably a circular inclined surface formed on the upper inner edge of a circular upright flange 7. This flange is on the inner edge of an annular shoulder 8 'which encircles the valve chamber. An adjusting ring 9, threaded on its inner circumference, encircles the upright flange 7 and the latter is threaded externally to receive and engage the thread on the ring. The valve is encircled on its lower surface near the circumference by a depending shoulder 10, forming an angular groove 11. The adjusting ring is similarly shouldered and grooved at 12 on its upper surface, the top surface of the upright flange forming the horizontal wall of such groove, and the two grooves coöperate to form a huddling chamber 13. To adjust the ring 9 vertically, it is rotated about its axis; and to permit access to the ring, an aperture is formed in the casing at 23. This aperture is threaded internally and closed by means of a threaded plug 24 having a laterally flattened head 25 so that it may be turned by means of a wrench. To hold the adjusting ring 9 in adjusted position, it is provided with a series of notches or teeth 26 spaced along its circumference, and a pin or bolt 27 to coöperate with the notches is mounted on the extremity of the plug.

In valves of this type it has been customary to place the threaded connection between the ring and the outer shell, the threads being on the inner face of the external wall and on the outer surfaces of the teeth. In the present instances they are on the inner surface of the ring and on the outer surface of the seat flange. In the old device, rust and mud collect in the apertures between the teeth and in contact with the internally disposed threads on the casing, and are ground between the threaded surfaces when the ring is rotated. In the device herein shown and described, the threads are uninterrupted and continuous, and there are no pockets for rust, and the threaded surfaces are so associated that mud and rust cannot get between them. As the threaded surfaces are internally placed, their temperature is maintained at a point above that of condensation. This prevents corrosion. As the adjusting ring is out of contact with the outside walls and both the ring and the flange 7 are well within the chamber, the threaded members are maintained at a substantially equal temperature so that harmful differences of thermal expansion are eliminated.

The valve chamber is provided with cylindrical guiding surfaces, 14 above the seat and 15 below, and the valve is provided with coöperating guiding surfaces 16 and 17 respectively. It will be noted that the upper cylindrical guide 14 forms a depending circular flange on the inner edge of an inwardly disposed, circular horizontal flange 18 of the casing near the lower edge of the dome. The horizontal shoulder 18 and the cylindrical flange 14 form with the casing 1 an annular chamber 19, commonly known as a hood. The lower extremity of the hood opens directly over the outlet of the valve and through this hood the steam passes to the muffling dome 2. It is customary to construct the hood in the form of an annular passage encircling the casing within the dome and to perforate both the top and internal and external side walls of such hood to provide for the escape of steam.

It is found, however, that the perforations, particularly those in the inside walls, become clogged. To avoid this, the hood of the present valve has its top wall, only, apertured, and as it is thus made unnecessary to have the side walls of the hood within the dome, the top wall of the hood is placed near the bottom of the dome, as shown. It has been found that round perforations in the hood are more easily clogged than slots; for this reason, I have provided elongated annular slots 20 in the top wall of the hood for the escape of steam. The dome above the slots 20 is perforated at 22 to provide for the final escape of steam to the outside air. As the steam escapes from the huddling chamber 13, it passes upward through the hood 19 and passes through the slots 20 at considerable velocity. In this way, the apertures 20 are kept clear.

The valve is maintained on its seat by means of a spiral spring 28 which bears at its lower extremity against the rocking bearing block 29 which has a bearing in the center of the upwardly disposed cavity 30 in the upper surface of the valve. At its upper extremity, the spring engages a bearing block 31 which is apertured centrally to form a circular socket 32 which is engaged by the rounded lower extremity 33 of the adjusting screw 34. This screw is provided with a laterally flattened head 35. From the head to a point near the lower extremity, it is threaded as shown, and the lower end is rounded, as previously stated. The upper end of the casing 2 is apertured at 36 to form a bearing for the adjusting screw and the bearing is threaded to coöperate with the thread on the screw. The dome 2 which incloses the upper end of the casing, and has a screw threaded engagement with the casing at 37 near the central circumference of the latter, is apertured at 38 centrally of its top wall to permit the screw to protrude upwardly. This aperture is of a diameter appreciably greater than the diameter of the screw so that the latter passes freely therethrough. Encircling the aperture is an annular shoulder, or boss, 39, and this shoulder is threaded externally, as shown, and flattened to seat a wrench for turning the dome to engage and disengage the threads 37. A lock nut 40 engages the thread of the adjusting screw and may be tightened against the shoulder, or boss, 39 to lock the screw in adjusted position. A substantially cylindrical cap 41 of internal diameter in excess of the greatest external diameter of the lock nut and adjusting screw, incloses both the upper extremity of the screw and the nut. This cap is threaded internally at its lower edge to engage the thread on the seat or boss 39 and is provided with flattened external surfaces 42 so that it may be engaged by a wrench.

It will be noted that the upper wall of the casing is apertured at 43 to permit escape of steam which may pass between the guiding surfaces 14 and 16 and so get within the spring chamber 50. Part of such steam will pass upward through the aperture 38 around the adjusting screw 34 and find its way to the cap 42. To provide for the escape of this steam and for other purposes to be specified, a series of apertures 44 extending around the cap is provided. An upright flange 45 on the upper surface of the dome encircles the shoulder or cap seat 39 outside the lower extremity of the cap and spaced therefrom. This flange is also provided with a series of apertures 44 spaced circumferentially of the upright flange, and when it is desired to close the cap permanently, so that the valve cannot be tampered with without the knowledge of the supervising authority, a wire 46 is passed through the corresponding apertures of the cap and the flange, and the ends are brought together and sealed at 47, as shown.

Of the various muffled pop safety valves in use, substantially all are provided with a cap for the tension or adjusting screw to prevent its being tampered with by the attendant immediately in charge, or merely for protection from the weather. Some of these caps are made integral with the dome. This construction is open to the objection that it renders the screw difficult of access as to reach it the dome itself must be removed. In other cases there is a cap which is formed separately from the dome, but it acts as a combined cap and lock nut or is connected in some other way to the adjusting screw. A locking cap is open to the objection that the adjusting screw is inaccessible during and after locking. Its adjustment is frequently changed during the operation of seating the cap and to ascertain whether such loss of adjustment has taken place is difficult; also, in removing it, the adjustment of the spring is often changed or lost and the tension of the spring must then be re-adjusted. If such a locking cap is removed for any reason, the screw is left unlocked. The cap herein shown and described and which forms an important feature of my invention overcomes both of these objections, as it is removable separately from the dome; at the same time it is in no wise connected to the adjusting screw and is wholly independent thereof. When the tension of the valve has once been adjusted, it does not require re-adjustment until a new seating of the valve is desired. The advantages of this feature will be apparent to those skilled in the art.

Having thus described my invention, what I claim and desire to secure by Letters Patent is:

1. In a safety valve having a muffling dome, a compression spring tending to maintain the valve closed, a screw to regulate the tension of the spring, a lock nut on the screw, the dome apertured to allow the screw to protrude, a removable cap covering the opening and inclosing the upper end of the screw and lock nut, and means for securing the cap in position on the dome, the cap being of internal diameter greater than the diameter of the screw or lock nut and free from contact with either.

2. In a safety valve having a muffling dome and a tension spring, the dome apertured to permit the screw to protrude therefrom, a cap of internal diameter greater than the diameter of the screw, free from engagement with the screw and closing the aperture in the dome and secured to the dome, the cap provided with a series of holes arranged along its lower edge, the dome provided with a similar series of holes, a wire passed through corresponding holes of each series, and sealing means for joining the ends of the wire.

3. In a safety valve, a valve casing, a valve seat, an external screw thread surrounding the seat, an adjusting ring having an internal thread engaging the external thread and grooved on its upper surface, a valve proper grooved to coöperate with the adjusting ring to form a huddling chamber, a spring to maintain the valve on its seat, an adjusting screw seated in the casing to adjust the tension of the spring, a dome inclosing the upper end of the casing and apertured to permit the screw to protrude therefrom, a screw-threaded seat surrounding the aperture, a cap of greater diameter than the adjusting screw inclosing the screw and threaded to engage the threaded seat, the cap being of internal diameter greater than the external diameter of the screw so that it is free from engagement therewith.

4. In a safety valve, in combination, a valve chamber, a valve therein, a hood surrounding the chamber and open below adjacent the valve opening, a dome also surrounding the chamber, the hood having a flat top wall which forms the bottom wall of the dome, the wall between the dome and hood being apertured with annularly placed slots.

5. In a safety valve, in combination, a valve seat a valve coöperating therewith, a dome apertured to communicate with the outside air, a passage leading from the bottom of the dome to the valve opening, the bottom of the dome apertured to form annular slots communicating with the passage.

Signed by me at Baltimore, Maryland, this 4th day of June, 1909.

HARRY C. McCARTY.

Witnesses:
 EDWARD L. BASH,
 S. RALPH WARNKEN.